United States Patent [19]

Mizuno et al.

[11] Patent Number: 4,957,967
[45] Date of Patent: Sep. 18, 1990

[54] THERMOPLASTIC RESIN COMPOSITION

[75] Inventors: Yukio Mizuno; Takashi Maruyama, both of Chiba, Japan

[73] Assignee: Sumitomo Chemical Company, Limited, Osaka, Japan

[21] Appl. No.: 370,334

[22] Filed: Jun. 22, 1989

[30] Foreign Application Priority Data

Jun. 30, 1988 [JP] Japan ................. 63-165376

[51] Int. Cl.$^5$ ................. C08L 71/12; C08L 61/28; C08L 67/02
[52] U.S. Cl. .......................... 525/68; 525/66; 525/92; 525/397; 525/133; 525/390; 525/395
[58] Field of Search ............... 525/397, 66, 92, 133, 525/390, 395, 68

[56] References Cited

U.S. PATENT DOCUMENTS 4,013,613 3/1977 Abolins et al. ............... 260/40 R

FOREIGN PATENT DOCUMENTS

| 43-17812 | 7/1943 | Japan . |
| 47-26421 | 7/1972 | Japan . |
| 49-5220 | 2/1974 | Japan . |
| 49-75662 | 7/1974 | Japan . |
| 49-98858 | 9/1974 | Japan . |
| 51-21664 | 7/1976 | Japan . |
| 60-221459 | 11/1985 | Japan . |
| 62-121757 | 6/1987 | Japan . |
| 62-121760 | 6/1987 | Japan . |
| 62-257958 | 11/1987 | Japan . |
| 62-260855 | 11/1987 | Japan . |
| 62-263251 | 11/1987 | Japan . |

*Primary Examiner*—Lewis T. Jacobs
*Assistant Examiner*—William Clark
*Attorney, Agent, or Firm*—Cushman, Darby & Cushman

[57] ABSTRACT

A thermoplastic resin composition having superior processability and impact strength has:

(A) 100 parts by weight of a composition comprising 95-5 % by weight of a polyphenylene ether obtained by oxidation polymerization of at least one phenol compound represented by the following formula:

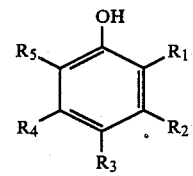

(wherein $R_1$, $R_2$, $R_3$, $R_4$ and $R_5$ which may be identical or different, each represents a hydrogen atom, a halogen atom, a hydrocarbon group or a substituted hydrocarbon group and at elast one of them is a hydrogen atom) and 5-95 % by weight of a thermoplastic polyester, and (B) 0.01-10 parts by weight of an amino resin obtained by modifying, with an alcohol, an addition reaction product of formaldehyde and at least one compound selected from the group consisting of melamine, guanamine and urea.

5 Claims, No Drawings

THERMOPLASTIC RESIN COMPOSITION

The present invention relates to a resin composition which comprises a polyphenylene ether and a thermoplastic polyester.

More particularly, it relates to a novel thermoplastic resin composition which comprises a resin composition comprising a polyphenylene ether and a thermoplastic polyester, to which are added an amino resin and, if necessary, an impact strength modifier. This thermoplastic resin composition is excellent in balances of properties such as processability, mechanical properties, heat resistance and oil resistance.

The composition of the present invention can be made into shaped articles, sheets, or films by injection molding, extrusion molding, etc.

Polyphenylene ether is a thermoplastic resin superior in mechanical properties, heat resistance, electrical properties, and besides dimensional stability and has been noticed as a resin suitable for various uses, but it is inferior in processability, impact strength and oil resistance against chemicals such as gasoline.

In order to improve processability and impact strength, blends of polyphenylene ether with polystyrene or rubber-reinforced polystyrene have been proposed in Japanese Patent Publication (Kokoku) No. 43-17812 and Japanese Patent Publication (Kokai) No. 49-98858. However, these resin compositions are also inferior in oil resistance.

Resin compositions comprising rubberreinforced polystyrene/polyphenylene ether have excellent impact strength and processability and are industrially mass-produced. However, they are limited in their uses due to their inferior oil resistance.

Further, Japanese Patent Kokoku No. 51-21664 has proposed to add a polyester in order to improve processability and oil resistance of polyphenylene ether. However, polyphenylene ether and polyester are very poor in compatibility with each other and the resulting resin composition is inferior in mechanical properties. Especially, it is quite inferior when content of polyester exceeds 20%. Furthermore, molded products obtained therefrom by injection molding show delamination phenomenon and good molded products cannot be obtained.

As methods to improve the above defect, Japanese Patent Publication (Kokai) No. 60-221459 has proposed to add a copolymer of a monomer of unsaturated compound having an epoxy group and styrene, Japanese Patent Publication (Kokai) No. 62-260855 has proposed to add, for example, maleic anhydride and Japanese Patent Publication (Kokai) No. 62-263251 has proposed to add a copolymer of styrene and unsaturated carboxylic acid. However, these methods are still unsatisfactory.

The principal object of the present invention is to provide a practical resin composition which is improved in compatibility between polyphenylene ether and thermoplastic polyester and which is excellent in oil resistance as well as heat resistance and impact strength.

As a result of the inventors'intensive researches in an attempt to develop a technique effective to improve resin compositions comprising polyphenylene ether and thermoplastic polyester, it has been found that a resin composition excellent in oil resistance, mechanical properties, heat resistance and processability can be obtained by adding an amino resin and, if necessary, an impact strength modifier to a resin composition comprising polyphenylene ether and thermoplastic polyester.

The present invention relates to a thermoplastic resin composition which comprises:

(A) 100 parts by weight of a composition comprising 95 - 5% by weight of a polyphenylene ether obtained by oxidation polymerization of at least one phenol compound represented by the following formula:

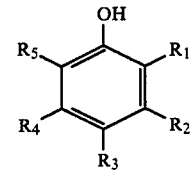

wherein $R_1$, $R_2$, $R_3$, $R_4$ and $R_5$ which may be identical or different, each represents a hydrogen atom, a halogen atom, a hydrocarbon radical or a substituted hydrocarbon radical and at least one of them is a hydrogen atom and 5–95% by weight of a thermoplastic polyester, and (C) 0.01–10 parts by weight of an amino resin, obtained by modifying with an alcohol an addition reaction product of formaldehyde and at least one compound selected from melamine, guanamine and urea.

The polyphenylene ether (A) used in the present invention is a polymer obtained by oxidation polymerization of one or more phenol compound represented by the following formula:

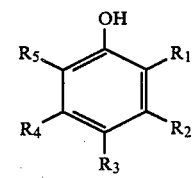

(wherein $R_1$, $R_2$, $R_3$, $R_4$ and $R_5$ which may be identical or different, each represents a hydrogen atom, a halogen atom, a hydrocarbon radical or a substituted hydrocarbon radical and at least one of them is a hydrogen atom) with oxygen or a gas containing oxygen using an oxidation coupling catalyst Examples of $R_1$, $R_2$, $R_3$, $R_4$ and $R_5$ in the above formula are hydrogen atom, chlorine atom, fluorine atom, bromine atom, iodine atom, methyl group, ethyl group, propyl group, butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group and ethylphenyl group.

Examples of the phenol compounds as shown by the above formula are phenol, o-, m- or p-cresol, 2,6-, 2,5-, 2,4- or 3,5-dimethylphenol, 2-methyl-6-phenyl-phenol, 2,6-diphenylphenol, 2,6-diethylphenol, 2-methyl-6-ethylphenol, and 2,3,5-, 2,3,6-, or 2,4,6-trimethylphenol. These phenol compounds may be used alone or in combination of two or more.

Furthermore, the polyphenylene ether may be copolymers of the phenol compounds of the above formula and other phenol compounds, for example, dihydric phenols such as bisphenol A, tetrabromobisphenol A, resorcin and hydroquinone.

Any oxidation coupling catalyst may be used for oxidation polymerization of the phenol compound as far as it has polymerization ability. Examples thereof are catalysts comprising cuprous salt and tert. amine, such as cuprous chloride/ trimethylamine, cuprous acetate/-triethylamine and cuprous chloride/pyridine; catalysts comprising cupric salt/tert. amine and alkali metal hydroxide, such as cupric chloride/pyridine/potassium hydroxide; catalysts comprising manganese salt and primary amine, such as manganese chloride/ethanolamine and manganese acetate/ethylenediamine; catalysts comprising manganese salt and alcoholate or phenolate, such as manganese chloride/sodium methylate and manganese chloride/sodium phenolate; and catalysts comprising cobalt salt and tert. amine.

The thermoplastic polyesters used in the present invention are those which are obtained by polycondensation of a dicarboxylic acid or its functional derivative and a dioxy compound or its functional derivative.

As examples of the dicarboxylic acids, mention may be made of aromatic dicarboxylic acids such as terephthalic acid, isophthalic acid and 2,6-naphthalenedicarboxylic acid, nuclear substituted aromatic dicarboxylic acids, namely, the aromatic dicarboxylic acids as mentioned above where hydrogen atom of aromatic nucleus is substituted with methyl group, ethyl group, phenyl group or the like, aliphatic dicarboxylic acids of 2–20 carbon atoms such as adipic acid, sebacic acid, and dodecanedicarboxylic acids and alicyclic dicarboxylic acids such as cyclohexanedicarboxylic acids.

The functional derivatives of dicarboxylic acids include, for example, acid chlorides of the above compounds or esters such as methyl esters and phenyl esters of carboxylic acid.

Examples of the dioxy compounds are aliphatic diols or alicyclic diols such as ethylene glycol, 1,3-propanediol, 1,4-butanediol, 1,6- hexanediol, 1,10-decanediol and 1,4-cyclohexanediol and dihydric phenols represented by the following formula:

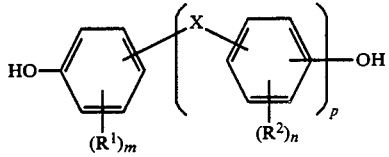

(wherein X represents an alkylene group of 1–10 carbon atoms, an alkylidene group of 1–10 carbon atoms, a cycloalkylene group of 4–8 carbon atoms, —O—, —S— or —SO$_2$— or the benzene nuclei directly link to each other, R$^1$ and R$^2$ each represents a halogen atom or an alkyl group of 1–12 carbon atoms, m and n each represents an integer of 0–4 and P represents 0 or 1), for example, bisphenol A, bis(4-hydroxyphenyl)-methane, bis-(4-hydroxy-3-methylphenyl)-propane, 2,2-bis-(3',5'-dibromo-4'-hydroxyphenyl)-propane, 1,1-bis-(4'-hydroxyphenyl)-cyclohexane, resorcin, hydroquinone, 4,4'-dioxy-diphenyl, and bis-(4-hydroxyphenyl)-sulfone and nucleus methyl substituted derivatives thereof.

Representatives of the functional derivatives of dioxy compounds are diacetate derivatives.

These compounds may be used alone or in combination of two or more. Furthermore, copolymers with p-oxybenzoic acid or polyethylene glycol may also be used.

Among these thermoplastic polyesters, preferable examples are polyethylene terephthalate. polybutylene terephthalate and modified polymers containing these structures, for example, copolymers with polyethers such as polyethylene glycol and polypropylene glycol.

Further, one preferred embodiment is combination of a polyphenylene ether having an intrinsic viscosity of 0.25–0.45 dl/g with polyethylene terephthalate or polybutylene terephthalate having an intrinsic viscosity of 0.9–2.5 dl/g.

Suitable mixing ratio of polyphenylene ether and thermoplastic polyester is polyphenylene ether: 5–95% by weight and thermoplastic polyester: 95–5% by weight. If amount of thermoplastic polyester is less than 5% by weight, effect to improve solvent resistance is small and if amount of thermoplastic polyester is more than 95% by weight, thermal properties such as heat distortion temperature tend to deteriorate.

The amino resin (C) used in the present invention can be obtained by modifying with alcohol an addition reaction product of formaldehyde and at least one compound selected from melamine, guanamine and urea.

In more detail, the amino resin obtained by modifying melamine, guanamine and urea is represented by the following formula (I), (II) or (III).

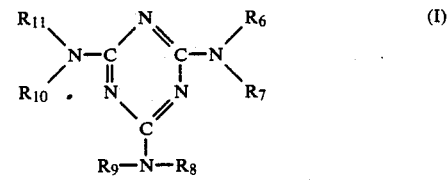

[wherein R$_6$, R$_7$, R$_8$, R$_9$, R$_{10}$ and R$_{11}$ each represents a hydrogen atom, an alkyl group, an aryl group or a substituent denoted by the formula (I'): —(CH$_2$ - O)—R$_{12}$ (wherein R$_{12}$ represents a hydrogen atom or an alkyl or cycloalkyl group 1–10 carbon atoms) and at least one of R$_{6-R11}$ is a substituent denoted by the formula (I')].

Examples of the melamine derivatives represented by the formula (I) are alkoxymethylmelamine derivatives or cycloalkoxymethylmelamine derivatives which are obtained by modifying various methylolmelamines including from monomethylolmelamine to hexamethylolmelamine produced by condensation of melamine (2,4,6-triamino-1,3,5-triazine) and formaldehyde with at least one of monohydric alcohols such as methyl alcohol, ethyl alcohol, n-propyl alcohol, isopropyl alcohol, allyl alcohol, crotyl alcohol, n-butyl alcohol, isobutyl alcohol, secbutyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among them, preferred are those which are obtained by etherifying methylolmelamine with a lower alcohol such as methyl alcohol or butyl alcohol or those which are obtained by mixed-etherification with these two alcohols. Especially preferred are hexamethoxymethylmelamine and hexabutoxymethylmelamine obtained by modifying hexamethylolmelamine prepared by methylolating all of the amino groups attached to triazine nucleus of melamine with methyl alcohol or n-butyl alcohol, in view of compatibility and reactivity with other resins and storage stability.

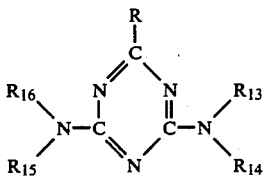
(II)

[wherein R represents a hydrogen atom, an alkyl group, an alkoxy group or an aryl group excluding amino group, $R_{13}$, $R_{14}$, $R_{15}$ and $R_{16}$ each represents a hydrogen atom, an alkyl group, an aryl group or a substituent represented by the above-mentioned formula (I') and at least one of $R_{13}$–$R_{16}$ is a substituent represented by the formula (I')].

Examples of the guanamine derivatives represented by the formula (II) are guanamine derivatives which are obtained by etherifying various methylolguanamines including from monomethylolguanamine to tetramethylolguanamine produced by condensation of guanamine(6-substituted-2,4-diaminotriazine-1,3-5) and formaldehyde with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among the guanamines, preferred is benzoguanamine(2,4-diamino-6-phenyltriazine-1,3,5).

Among the above etherified guanamine derivatives, preferred are methoxymethylguanamine derivatives and butoxymethylguanamine derivatives obtained by etherification with a lower alcohol such as methyl alcohol or butyl alcohol, and those which are obtained by mixed-etherification with these two alcohols. Especially preferred are tetramethoxymethylbenzoguanamine and tetrabutoxymethylbenzoguanamine obtained by modifying tetramethylolbenzoguanamine prepared by methylolating all of the amino groups attached to triazine nucleus of benzoguanamine with methyl alcohol or n-butyl alcohol, in view of compatibility and reactivity with other resins, and storage stability.

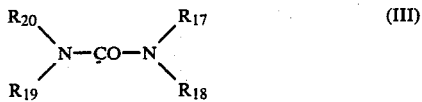
(III)

[wherein $R_{17}$, $R_{18}$, $R_{19}$ and $R_{20}$ each represents a hydrogen atom, an alkyl group, an aryl group or a substituent represented by the above-mentioned formula (I') and at least one of $R_{17}$–$R_{20}$ is a substituent represented by the formula (I').]

Examples of the urea derivatives represented by the formula (III) are urea derivatives which are obtained by etherifying various methylolureas including from monomethylolurea to tetramethylolurea produced by condensation of urea and formaldehyde with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among them, preferred are those which are obtained by modification with a lower alcohol such as methyl alcohol or butyl alcohol and those which are obtained by mixed-etherification with these two alcohols. Especially preferred are tetramethoxymethylurea and tetrabutoxymethylurea obtained by modifying tetramethylolurea prepared by methylolating all or the amino groups of urea, with methyl alcohol or n-butyl alcohol, in view of compatibility and reactivity with other resins and storage stability.

These amino resins can be produced by various methods. For example, for producing methylated melamine, the following methods can be employed.

(1) A method which comprises allowing melamine to react with formalin under weak alkaline condition, liberating and drying the resulting methylolmelamine, etherifying the methylolmelamine in an alcohol under acidic condition and distilling off the reaction water together with alcohol.

(2) A method which comprises producing methylolmelamine in the same manner as in (1), partially dehydrating it in the reactor under reduced pressure, then adding an alcohol thereto to carry out reaction under acidic condition and removing the reaction water in the same manner as in (1).

Addition amount of amino resin (C) in the present invention is 0.01–10 parts by weight per 100 parts by weight of mixture of polyphenylene ether and thermoplastic polyester. When it is less than 0.01 part by weight, the effect aimed at by the present invention tends to decrease, and when it is more than 10 parts by weight, softening point of the composition tends to decrease.

The impact strength modifier (B) includes natural and synthetic rubber-like polymer materials which are elastic at room temperature and various modified rubber-like polymer materials.

Examples of the rubber-like polymer materials are natural rubber, butadiene polymer, butadiene-styrene copolymer (including random copolymer, block copolymer and its hydrogenated block copolymer, etc.), styrene-butadiene-styrene block copolymer and its hydrogenated copolymer, isoprene polymer, isoprene-styrene copolymer (including random copolymer, block copolymer and its hydrogenated block copolymer, etc.), chlorobutadiene polymer, butadiene-acrylonitrile copolymer, isobutylene polymer, isobutylene-butadiene copolymer, isobutyleneisoprene copolymer, acrylic ester copolymer, ethylenepropylene copolymer, ethylene-acrylic ester-maleic anhydride copolymer, ethylene-glycidyl methacrylatevinyl acetate copolymer, ethylene-butene copolymer, ethylene-propylene-diene copolymer, ethyenemethacrylate-glycidyl methacrylate copolymer, Thiokol rubber, polysulfide rubber, polyurethane rubber, polyether rubber (e.g., polypropylene oxide, etc.), epichlorohydrin rubber, chloroprene rubber and polyamide elastomer.

These rubber-like polymer materials can be produced by various processes such as emulsion polymerization and solution polymerization and using various catalysts such as peroxides, trialkylaluminum, lithium halides and nickel-based catalysts.

Furthermore, the rubber-like polymer material may be one which has various crosslinking degrees, various proportions of micro structures such as cis structure, trans structure and vinyl group or various average rubber particle sizes Various kinds of copolymers such as random copolymers, block copolymers, and graft copolymers may be used as the rubber-like polymer material of the present invention.

Further, the rubber-like polymer material also includes rubber-like polymer materials which are modified by various methods. These modified rubber-like polymer materials include those which are prepared by modifying the above-mentioned rubber-like polymer materials with at least one compound selected from the group consisting of compound having in its molecule at least one group selected from carboxyl group, amino group, imino group, epoxy group, amide group, vinyl group, isocyanate group and hydroxyl group, or with at least one compound selected from the group consisting of an acid anhydride, carboxylate ester and an oxazoline ring. Examples thereof are maleic anhydride modified ethylene-propylene copolymer, styrene modified ethylene-propylene copolymer, glycidyl methacrylate modified ethylene-propylene copolymer, and maleic anhydride modified styrene-butadiene copolymer (random copolymer, block copolymer and hydrogenated block copolymer, etc.).

Modification of rubber-like polymer materials can be performed by introducing thereto at least one of the above-mentioned modifying compounds by any methods. Generally, it is carried out by use of copolymerizations such as random copolymerization, block copolymerization and graft copolymerization to cause a reaction with main chain, side chain or terminal of molecule.

In order to improve compatibility of polyphenylene ether and thermoplastic polyester, the resin composition of the present invention may further contain a copolymer of a styrene resin having epoxy group (e.g., Japanese Patent Publication (Kokai) No. 60-221459), a glycidyl group-containing copolymer of α-olefin and a glycidyl ester of α•β-unsaturated acid (e.g., Japanese Patent Publication (Kokai) No. 62-121760), or compounds which contain in molecule both a carbon-carbon double bond or a carboncarbon triple bond and at least one group selected from a carboxylic acid group, an acid anhydride group, an acid amide group, an imido group, a carboxylate ester group, an epoxy group, an amino group and a hydroxyl group (e.g., Japanese Patent Publication (Kokai) No. 62-257958).

The resin composition of the present invention may also contain other polymer compounds.

As these other polymer compounds, mention may be made of, for example, polyolefins such as polyethylene, polypropylene, ethylene-propylene block copolymer, polymethylpentene, and ethylene-αolefin copolymer; homopolymers and copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer, polystyrene, polybutadiene and alkenyl aromatic resins such as styrene-butadiene rubber modified polystyrene and ethylene-propylene rubber modified polystyrene; condensation-polymerized compounds such as polycarbonates, polysulfones, polyether sulfones and polyphenylene sulfide; polyamides such as 6-nylon, 6,6-nylon and 12-nylon; and polyacetal. Furthermore, various thermosetting resins such as silicone resin, fluororesin, polyimide, phenol resin, polyamideimide, alkyd resin, unsaturated polyester resin, epoxy resin and Dapon resin.

The resin composition of the present invention may also be used in the form of composite materials, preferably those reinforced with fibers such as glass fiber, carbon fiber, polyamide fiber and metallic whisker and those to which are added inorganic fillers such as silica, alumina, calcium carbonate, talc, mica, carbon black, $TiO_2$, ZnO and $Sb_2O_3$, flame-retardant aids, lubricants, nuclear agents, plasticizers, dyes, pigments, antistatic agents, antioxidants, or weatherability providing agents.

The method for producing the resin composition of the present invention is not limitative and any known methods can be used.

A method in which the components are mixed in the form of solutions and solvents are evaporated or in which said mixture is precipitated in a non-solvent, is effective. However, from industrial viewpoint, a method of kneading them in molten state is employed in practice. The melt kneading is carried out using such a kneading machine as generally-used single-screw or twin-screw extruder and various kneaders. A twin-screw extruder is especially preferred.

Before kneading, it is preferred to uniformly blend respective resin components in the form of powder or pellet by using such a mixer as a tumbler or a Henschel mixer. However, each resin may be separately fed directly to a kneading apparatus through a metering device without the blending The kneaded resin composition can be molded by injection, extrusion or various other molding processes. The present invention further includes a method in which molded articles are obtained by dry-blending the components firstly at the time of injection molding or extrusion molding and then directly kneading the components during its operation of melt processing, without the previous kneading.

There is no special limitation in sequence of kneading of the components. That is, thermoplastic polyester, polyphenylene ether, and amino resin may be kneaded at the same time or thermoplastic polyester and polyphenylene ether are previously kneaded to obtain composition (A) and then amino resin (C) may be kneaded with the composition (A). Other sequences of kneading may also be employed.

The following examples are merely illustrative of the present invention, and the present invention is not restricted to said examples. In the examples, deflection temperature under load (H.D.T.) and Izod impact strength (thickness: 3.2 mm) were measured according to JIS K7207 and JIS K7110.

REFERENCE EXAMPLE 1

(Preparation of amino resin (C)):

C-1: 28.3 parts by weight of urea, 100 parts by weight of 37% neutral formalin and 60 parts by weight of n-butanol were mixed and heated from 25° C. to 94°–96° C. in 15–25 minutes. The mixture was kept at that temperature for 10–15 minutes and 0.07 part by weight of formic acid was added thereto. Then, the mixture was refluxed for 30–60 minutes under atmospheric pressure. The reaction system was cooled to 70°–75° C. while the pressure was reduced so that the reaction system was kept boiling and water was removed by azeotropy with butanol under a reduced pressure of 200–400 mmHg. Thereafter, temperature was gradually raised to 100°–105° C. to obtain butylated urea (C-1). An analysis showed that the number of butanol bonded was about 2 mol per 1 mol of urea.

C-2: A mixture of 378 parts by weight of melamine and 810 parts by weight of 37% formalin was adjusted to pH 7–8 with sodium hydroxide. The mixture was heated to about 70° C. and when it became transparent, 1800 parts by weight of methyl alcohol and 1.9 parts by weight of oxalic acid were added thereto. Then, the mixture was boiled for several minutes. The reaction mixture was cooled, then filtrated and concentrated under reduced pressure to obtain methylated melamine (C-2). An analysis showed that the number of methanol bonded was about 3 mol per 1 mol of melamine.

C-3: In the same manner as in C-2, methylated melamine (C-3) was prepared from 378 parts by weight of melamine, 1700 parts by weight of 37% formalin and 3600 parts by weight of methanol. An analysis showed that the number of methanol bonded was about 6 mol per 1 mol of melamine.

C-4 A mixture of 187 parts by weight of benzoguanamine and 268 parts by weight of 37% formalin was adjusted to pH 7–8 with sodium hydroxide. The mixture was heated to about 70° C. and when it became transparent, 600 parts by weight of methyl alcohol and 0.6 part by weight of oxalic acid were added thereto. Then, the mixture was boiled for several minutes. The reaction mixture was cooled, then filtrated and concentrated under reduced pressure to obtain methylated benzoguanamine (C-4). An analysis showed that the number of methanol bonded was about 3 mol per 1 mol of benzoguanamine.

EXAMPLES 1–8

Poly-(2,6-dimethyl-1,4-phenylene ether) (intrinsic viscosity measured in chloroform: 0.30 dl/g) obtained by dissolving 2,6-dimethylphenol in toluene and methanol, adding thereto manganese chloride-ethylenediamine and oxidizing the mixture in an oxidizing atmosphere, the thermoplastic polyester, the impact strength modifier as shown in Table 1 and amino resin C-1, C-2, C-3 or C-4 obtained in Reference Example 1 were dry-blended at the ratio as shown in Table 1 and then the mixture was kneaded at 250°–300° C. for 5 minutes. A batch type small sized twin-screw kneader (Laboplast-mill ® manufactured by Toyoseiki Co.) was used as a kneading apparatus. The results are shown in Table 1.

COMPARATIVE EXAMPLES 1–2

Example 1 was repeated except that amino resin (C) was not added. The results are also shown in Table 1.

EXAMPLES 9–10

Example 1 was repeated except that impact strength modifier was not added. The results are also shown in Table 1.

COMPARATIVE EXAMPLES 3–4

Example 1 was repeated except that both the amino resin and the impact strength modifier were not added. The results are also shown in Table 1.

The present invention provides a composition improved in compatibility between thermoplastic polyester and polyphenylene ether and excellent in processability and impact strength. Thus, the present composition has a wide variety of uses.

This novel composition can be easily processed into shaped articles, sheets, films and the like by ordinary methods employed for thermoplastic resins such as injection molding and extrusion molding. These products are excellent in impact strength, heat resistance, oil resistance and processability. This composition is especially effective for injection molding.

TABLE 1

| | Composition | | | | | | | Izod Impact Strength (notched) | H.D.T. 4.6 kg/cm$^2$ |
|---|---|---|---|---|---|---|---|---|---|
| | Polyphenylene ether *1 | Saturated polyester *2 | | Impact strength modifier *3 | | Amino resin | | | |
| | (Part) | Kind | Part | Kind | Part | Kind | Part | Kg · cm/cm | (°C.) |
| Example 1 | 60 | PBT | 40 | SBS | 20 | C-1 | 3.0 | 38.7 | 170 |
| Example 2 | 30 | " | 70 | M-SEBS | 20 | " | 3.0 | 45.1 | 128 |
| Example 3 | 60 | " | 40 | S-EPR | 20 | C-2 | 2.0 | 40.6 | 160 |
| Example 4 | 45 | " | 55 | SEBS | 20 | C-3 | 2.0 | 55.3 | 154 |
| Example 5 | 70 | " | 30 | MEP | 20 | " | 2.0 | 35.1 | 172 |
| Example 6 | 35 | " | 65 | EMGMA | 20 | C-4 | 1.5 | 60.5 | 137 |
| Example 7 | 45 | PET | 55 | SEP | 20 | C-3 | 1.0 | 42.3 | 165 |
| Example 8 | 60 | " | 40 | GMA-EPR | 20 | C-2 | 1.0 | 35.4 | 178 |
| Comparative Example 1 | 45 | PBT | 55 | SEBS | 20 | — | — | 3.1 | 129 |
| Comparative Example 2 | 45 | PET | 55 | SEP | 20 | — | — | 3.0 | 165 |
| Example 9 | 70 | PBT | 30 | — | — | C-3 | 1.0 | 6.5 | 178 |
| Example 10 | 45 | PET | 55 | — | — | C-2 | 3.0 | 9.9 | 173 |
| Comparative Example 3 | 70 | PBT | 30 | — | — | — | — | 1.3 | 170 |
| Comparative Example 4 | 45 | PET | 55 | — | — | — | — | 0.9 | 160 |

Note:
*1: A polyphenylene ether having an intrinsic viscosity of 0.30.
*2: PBT; Polybutylene terephthalate having an intrinsic viscosity of 1.25. PET; Polyethylene terephthalate having an intrinsic viscosity of 1.00.
*3: SBS; Styrene-butadiene-styrene block copolymer. M-SEBS; Maleic anhydride modified hydrogenated styrene-butadiene-styrene block copolymer. St-EPR; Styrene modified ethylene-propylene copolymer. SEBS; Hydrogenated styrene-butadiene-styrene block copolymer (Styrene-ethylene-butylenestyrene block copolymer). MEP; Maleic anhydride modified ethylene-propylene copolymer. EMGMA; Ethylene-methacrylate-glycidyl methacrylate copolymer. SEP; Hydrogenated styrene-isoprene block copolymer (styrene-ethylene-propylene block copolymer). GMA-EPR; Glycidyl methacrylate modified ethylenepropylene copolymer.

We claim:

1. A thermoplastic resin composition which comprises:

(A) 100 parts by weight of a composition comprising 95-5% by weight of a polyphenylene ether obtained by oxidation polymerization of at least one phenol compound represented by the following formula:

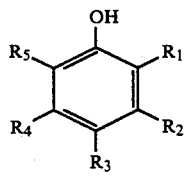

wherein $R_1$, $R_2$, $R_3$, $R_4$ and $R_5$ (which may be identical or different), each represents a hydrogen atom, a halogen atom, a hydrocarbon radical or a substituted hydrocarbon radical and at least one of them is a hydrogen atom, and 5-95% by weight of a thermoplastic polyester which is a polycondensation product of a dicarboxylic acid or its functional derivative and a dioxy compound or its functional derivative, and (B) 0.01-10 parts by weight of an amino resin obtained by modifying, with an alcohol, an addition reaction product of formaldehyde and at least one compound selected from the group consisting of melamine, guanamine and urea.

2. A thermoplastic resin composition which comprises:

(A) 100 parts by weight of a composition comprising 95-5% by weight of a polyphenylene ether obtained by oxidation polymerization of at least one phenol compound represented by the following formula:

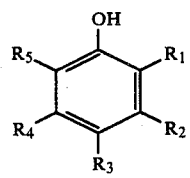

wherein $R_1$, $R_2$, $R_3$, $R_4$ and $R_5$ (which may be identical or different, each represents a hydrogen atom, a halogen atom, a hydrocarbon radical or a substituted hydrocarbon radical and at least one of them is a hydrogen atom, and 5-95% by weight of a thermoplastic polyester which is polyethylene terephthalate, polybutylene terephthalate or a modified polymer containing the structure thereof, and (B) 0.01-10 parts by weight of an amino resin obtained by modifying with an alcohol an addition reaction product of formaldehyde and at least one compound selected from the group consisting of melamine, guanamine and urea.

3. The thermoplastic resin composition according to claim 2 wherein the thermoplastic polyester is a combination of a polyphenylene ether having an intrinsic viscosity of 0.25-0.45 dl/g with polyehtylene terephthalate or polybutylene terephthalate having an intrinsic viscosity of 0.9-2.5 dl/g.

4. A thermoplastic resin composition according to claim 1, which further comprises: a component (C) comprising at least one impact strength modifier selected from the group consisting of natural and synthetic rubber-like polymer materials and modified rubber-like polymer materials.

5. A thermoplastic resin composition according to claim 2, wherein the amino resin (C) is represented by the following formula (I), (II) or (III):

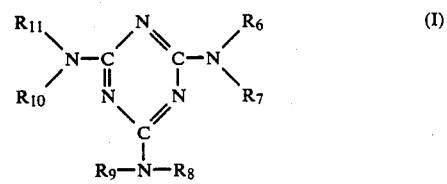

wherein $R_6$, $R_7$, $R_8$, $R_9$, $R_{10}$ and $R_{11}$ each represents a hydrogen atom, an alkyl group, an aryl group or a substituent denoted by the formula (I'): $+CH_2 - O+R_{12}$ where $R_{12}$ represents a hydrogen atom or an alkyl or cycloalkyl group of 1-10 carbon atoms, and at least one of $R_6$ -$R_{11}$ is a substituent denoted by the formula (I'):

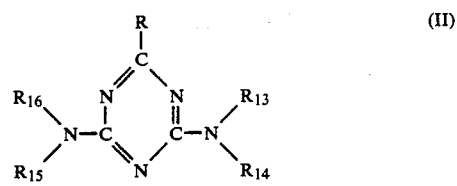

wherein R represents a hydrogen atom, an alkyl group, an alkoxy group or an aryl group excluding amino group, $R_{13}$, $R_{14}$, $R_{15}$ and $R_{16}$ each represents a hydrogen atom, an alkyl group, an aryl group or a substituent represented by the above-mentioned formula (I') and at least one of $R_{13}$ -$R_{16}$ is a substituent represented by the formula (I'); and

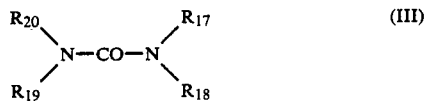

wherein $R_{17}$, $R_{18}$, $R_{19}$ and $R_{20}$ each represents a hydrogen atom, an alkyl group, an aryl group or a substituent represented by the above-mentioned formula (I') and at least one of $R_{17}$ -$R_{20}$ is a substituent represented by the formula (I').

* * * * *